Nov. 4, 1924.

J. E. LYNCH

LUBRICATING DEVICE

Filed May 23, 1922

1,514,092

John E. Lynch INVENTOR.

BY

Parsons & Bodell ATTORNEYS.

Patented Nov. 4, 1924.

1,514,092

UNITED STATES PATENT OFFICE.

JOHN E. LYNCH, OF SYRACUSE, NEW YORK.

LUBRICATING DEVICE.

Application filed May 23, 1922. Serial No. 563,155.

*To all whom it may concern:*

Be it known that I, JOHN E. LYNCH, a citizen of the United States, and a resident of Syracuse, in the county of Onondaga and State of New York, have invented a certain new and useful Lubricating Device, of which the following is a specification.

This invention has for its object a lubricating device which is particularly simple and economical in construction and highly efficient and durable in use, and further which can be readily applied to bearings having passages of different depths for receiving the stems of oil cups and devices without adjusting.

It further has for its object a sight feed for lubricating devices having rolling delivery members.

The invention consists in the novel features and in the combinations and constructions hereinafter set forth and claimed.

In describing this invention, reference is had to the accompanying drawings in which like characters designate corresponding parts in all the views.

Figure 1:
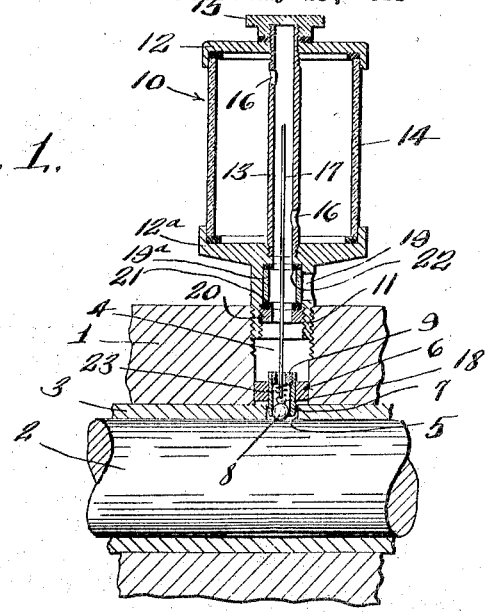
Figure 1 is a vertical sectional view of one embodiment of this lubricator, the bearing and the shaft journaled in the bearing being also shown in section.

This invention comprises primarily a lubricator located at the inner end of a transverse passage in the bearing block and comprising a head or body slidably fitting the passage and formed with a hole therethrough and with the retainer for the rolling delivery member as an inwardly extending tubular stem alined with said hole. It also comprises a lubricant supply element having a portion extending into the outer end of the passage in the bearing and spaced apart from the lubricator so that the lubricator may be placed into the passage of the bearing and the supply element which is usually a cup having a stem which can be secured into the outer end of such passage regardless of the depth of the passage in the bearing.

This lubricating device also comprises a particularly simple and efficient sight feed for lubricating devices having rolling delivery members as balls.

1 designates the bearing; 2 the shaft journaled in the bearing; and 3 the usual bushing between the shaft and the bearing. 4 is the transverse passage formed in the bearing, and 5 is a passage formed with a bushing and alined with the passage 4 and being usually of less diameter than the passage 4.

6 is the lubricator which comprises a body, or head slidably mounted in the inner end of the passage 4 and having a passage therethrough and also a tubular stem 7 projecting from its inner end through the passage 5 in the bushing 8 is a rolling delivery member at the inner end of the tube 7. The end margin of the tube 7 is turned inwardly into a circle of less diameter than the ball so that the ball is held from displacement out of the tube. The tube 7 as here shown, is inserted in the passage of the head 6 and the ball is retained in the passage by a retaining member having a passage therethrough, it being here shown as a hollow plug 9 threading into the outer end of the tube 7.

The lubricant supply element may be a tank communicating with a pipe or any other means with the passage 4, and as here shown, this supply element is an oil cup 10 having a stem 11 extending into the outer end of the passage 4, it being here shown as threading into the outer end of such passage 4. This oil cup may be of any suitable form, size and construction and as here shown, includes upper and lower heads 12, 12$^a$ held together by a tube 13 threading into the lower head 12$^a$ at the upper end of the stem 11, the upper head 12 threading on the upper end of the tube, and a cylindrical glass wall 14 interposed between the heads.

Also, a cap or closure 15 threads on the upper end of the tube. The tube is provided with suitable openings 16 into the interior of the cup. However, this oil supply member may be of any suitable form, size and construction.

The sight feed means by which it can be determined whether or not the oil is being delivered by the member 5, comprises a rod 17 having a head 18 resting on the delivery member 8, the rod extending upwardly through the tubular retaining member 9 of the lubricator 6 and into the stem 11 centrally thereof and the stem 11 is formed with a sight opening or window 19. Also a glass tube 19$^a$ is held in the portion of the stem 11 formed with a sight opening in order to close such opening, this tube being held in a position by an externally threaded ring 20 threading in the lower end of the stem 11 against a suitable packing ring 21, between said ring 20 and the lower end of the glass tube 19ª. The upper end of the glass tube thrusts against a similar ring 22 interposed between the upper end of the tube 19ª and the lower end of the tube 13.

A spring 23 is inserted between the head 18, on the rod 17, and the retaining member 8 and tends to lightly thrust the rod downward against the delivery member 8 and the delivery member 8 against the shaft 2.

In operation, the lubricator 6 is dropped into the passage 4 of the bearing and the cup 10 threaded into the upper end of the passage 4. When there is oil in the cup and the shaft is running, the oil is drawn into the passage 4 from the cup to the stem 11 through the passage of the retaining member to the delivery member 8 and as the cup is practically air tight, air seeps inwardly from the bearing and passes in bubbles up along the rod 4 past the sight opening so that it can be quickly determined whether or not oil is being fed. When desired, the lubricator can be removed after the cup 10 is removed by pulling on the rod 17.

Figure 2:
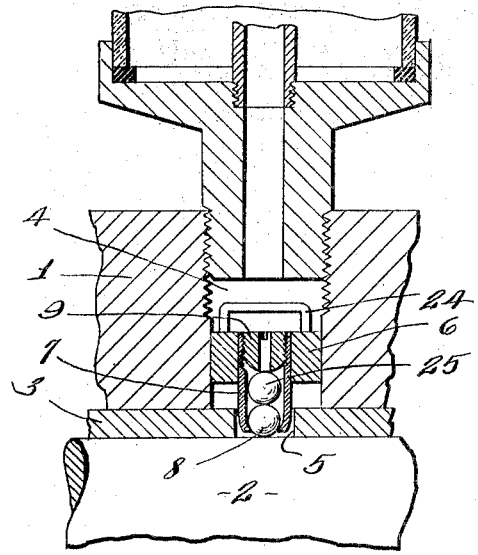
Figure 2 is a fragmentary view similar to Fig. 1, on a slightly enlarged scale, of another form of my invention.

As seen in Fig. 2, the sight feed feature may be eliminated and in order that the lubricator 6 may be removed it is provided with a suitable yoke 24 or other means by means of which a rod having a hook at its end may be hooked under the yoke 24. Also, the tube of the lubricator above the delivery ball may be filled with one or more balls 25.

Figure 3:
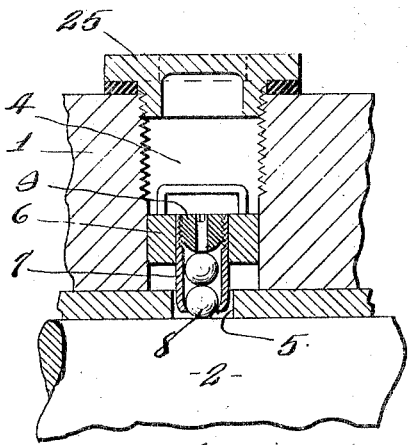
Figure 3 is a view similar to Fig. 1, of a third form of adaptation of this invention.

As seen in Fig. 3, the outer end of the passage 4 may be closed by a closure or plug 25 and the passage in the bearing filled with oil to serve as an oil reservoir.

This lubricator and lubricating device is particularly advantageous in that it is economical in construction, and can be made standard to all bearings without providing an adjustable stem, and further in that it automatically adapts itself to the depth of the passage of the bearing without any attention, calculation or adjustment by the operator.

What I claim is:

1. The combination with a bearing and a shaft journaled in the bearing, the bearing having a transverse oil passage therein, of a lubricator located in the inner end of the passage and entirely in said passage below the outer end of said passage and comprising a body fitting the passage and formed with a hole therethrough and with an inwardly extending tubular stem alined with said hole, and a delivery member located at the inner end of the tube and engaging the shaft and a member in the outer end of said passage and spaced apart from said lubricator at the inner end of the passage, substantially as and for the purpose described.

2. The combination with a bearing and a shaft journaled in the bearing, the bearing having a transverse oil passage therein, of a lubricator located in the inner end of the passage and entirely in said passage below the outer end of said passage and comprising a body fitting the passage and formed with a hole therethrough and with an inwardly extending tubular stem alined with said hole, a delivery member at the inner end of the tube engaging the shaft, and a retaining member in said hole, said retaining member being formed with an oil duct therethrough and a member in the outer end of said passage and spaced apart from said lubricator at the inner end of the passage, substantially as and for the purpose specified.

3. The combination with a bearing and a shaft journaled in the bearing, the bearing having a transverse oil passage therein, of a lubricator located in the inner end of the passage, and a lubricant supply element having a portion extending into the outer end of said passage and spaced apart from said lubricator, substantially as and for the purpose set forth.

4. The combination with a bearing and a shaft journaled in the bearing, the bearing having a transverse oil passage therein, of a lubricator at the inner ends of the passage including a delivery member engaging the shaft, and a rod extending upwardly from the delivery member, and a lubricant supply element having a stem extending into the upper end of said passage and spaced apart from the lubricator, said element having a sight opening, the rod extending through the portion formed with a sight opening, substantially as and for the purpose specified.

5. The combination with a bearing, and a shaft journaled in the bearing, the bearing being formed with a transverse oil passage therein, of a lubricator located at the inner end of the passage and comprising a body fitting the oil passage and formed with a hole therethrough and with an inwardly extending tubular stem alined with said hole, a rolling delivery member located at the inner end of the tube and engaging the shaft, a rod resting at its lower end on the delivery member and extending upwardly through the passage, a lubricant cup having a stem extending into the outer end of said passage, the stem being formed with a sight opening and a rod extending through the portion of the stem formed with the sight opening, substantially as and for the purpose set forth.

6. The combination of a bearing and a shaft journaled in the bearing, the bearing being formed with a transverse passage therein opening into the bore of the bearing, of a lubricating device including a delivery member arranged in the passage and engaging the shaft, an oil supply including a portion extending into said passage and formed with a sight opening, a rod engaging the delivery member at its inner end, the rod extending through said portion, substantially as and for the purpose described.

7. A lubricating device comprising a rotary delivery member, said device being formed with a sight opening at a point remote from the delivery member, and means for conducting air entering at the delivery end thereof across the sight opening, substantially as and for the purpose specified.

In testimony whereof, I have hereunto signed my name at Syracuse, in the county of Onondaga, and State of New York, this 22nd day of May, 1922.

JOHN E. LYNCH.